United States Patent
Gearhart et al.

(12) 
(10) Patent No.: US 12,010,080 B2
(45) Date of Patent: Jun. 11, 2024

(54) SYNDICATION OF LINKS TO CONTENT

(71) Applicant: Apple Inc., Cupertino, CA (US)

(72) Inventors: Christopher J. Gearhart, Mountain View, CA (US); Alykhan F. Kanji, Cupertino, CA (US); Erik A. Partridge, Santa Clara, CA (US); Erik M. Berget, San Francisco, CA (US); Karthik Sudhir, Campbell, CA (US); Michael W. Fullerton, Campbell, CA (US); Sofiane Toudji, San Francisco, CA (US); Stephen M. Lottermoser, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/744,599

(22) Filed: May 13, 2022

(65) Prior Publication Data

US 2022/0377032 A1    Nov. 24, 2022

Related U.S. Application Data

(60) Provisional application No. 63/197,224, filed on Jun. 4, 2021, provisional application No. 63/189,666, filed on May 17, 2021.

(51) Int. Cl.
*H04L 51/18* (2022.01)
*H04L 51/046* (2022.01)

(52) U.S. Cl.
CPC ............ *H04L 51/18* (2013.01); *H04L 51/046* (2013.01)

(58) Field of Classification Search
CPC .............................. H04L 51/18; H04L 51/046
See application file for complete search history.

(56) References Cited

U.S. PATENT DOCUMENTS

2009/0061824 A1* 3/2009 Neelakantan ........... H04L 51/04
                                                        455/566
2012/0150833 A1* 6/2012 Parthasarathy ....... G06F 16/955
                                                        707/706

(Continued)

FOREIGN PATENT DOCUMENTS

EP          3076608          10/2016

OTHER PUBLICATIONS

Extended European Search Report from European Patent Application No. 22173718.2, dated Sep. 28, 2022, 4 pages.

(Continued)

*Primary Examiner* — Johnny B Aguiar
(74) *Attorney, Agent, or Firm* — BAKERHOSTETLER (57) ABSTRACT

A method is provided that includes receiving, by a first process executing on an electronic device and from a second process executing on the electronic device, a request for links to content items that are associated with the second process. The method further includes obtaining, by the first process and from a link index, a link to a content item associated with the second process, wherein the link index is locally stored on the electronic device and the link index comprises links to content items communicated via a third process executing on the electronic device. The link to the content item obtained from the link index is provided by the first process for presentation by the second process, wherein selection of the link causes the second process to present the content item.

20 Claims, 5 Drawing Sheets

(56) References Cited

U.S. PATENT DOCUMENTS

| | | | |
|---|---|---|---|
| 2012/0150839 A1* | 6/2012 | Sundelin | G06F 16/31 707/711 |
| 2012/0278402 A1 | 11/2012 | Limont et al. | |
| 2016/0085780 A1* | 3/2016 | Lew | G06F 16/951 707/711 |
| 2017/0180285 A1* | 6/2017 | Contractor | H04L 51/08 |
| 2017/0193051 A1* | 7/2017 | Ghafourifar | G06F 16/24564 |
| 2019/0205423 A1* | 7/2019 | Haven | G06F 16/2358 |
| 2021/0099405 A1 | 4/2021 | Al Majid et al. | |

OTHER PUBLICATIONS

European Office Action from European Patent Application No. 22173718.2, dated Oct. 10, 2022, 9 pages.

* cited by examiner

SYNDICATION OF LINKS TO CONTENT

CROSS REFERENCE TO RELATED APPLICATIONS

The application claims the benefit of priority to U.S. Provisional Application No. 63/197,224, entitled "Content Syndication", filed on Jun. 4, 2021, and claims the benefit of priority to U.S. Provisional Application No. 63/189,666, entitled "Content Syndication", filed on May 17, 2021, the disclosures of which are hereby incorporated by reference herein in their entirety.

TECHNICAL FIELD

The present description relates generally to content items shared between users, and more particularly to managing shared links to content items across applications.

BACKGROUND

Messaging applications facilitate communications between users via networks such as the internet. In addition to text messages, users may use messaging applications to share links to content items such as different types of media files. A user may utilize a particular client application to access an associated type of media file located using a link.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Messaging applications, such as chat applications, facilitate near real-time communications between users over a network. In addition to text content, messaging applications have evolved to allow other types of shared content such as images and animations to be presented within a conversation thread. However, messaging applications may be unable to present, and/or it may be impractical for messaging applications to transmit, other types of content such as audio clips, video clips, websites, etc. within a conversation thread. For these types of content, users may share a link to a desired content item in the conversation thread. The link identifies the location of the content item and facilitates other users participating in the conversation thread to access the content item by selecting the link presented in the conversation thread.

Different types of content items may require specific client applications that support the types of content items to access and consume those content items. For example, audio files may require an audio client application to load and playback an audio file when selected by a user. Similarly, video files may require a video client application to load and playback a video file when selected by a user. Upon selecting a link to a content item within a conversation thread of a messaging application, the messaging application may be pushed to the background by the operating system of the computing device on which the messaging application is being executed and the client application associated with the type of content item identified by the selected link may be launched and/or opened in the foreground of the computing device. In the client application, the context of the conversation thread in which the link was shared may be lost and the user may be forced to toggle between the messaging application and the client application to refresh the user's memory of the context while consuming the linked content item.

Conversation threads may include multiple links shared by one or more users participating in the conversation thread. In addition, a user may be participating concurrently in multiple conversation threads, each of which may include one or more shared links to content items. Accessing the linked content items as links are shared in each conversation thread may be too jarring to the flow of the conversation thread for the user. Furthermore, toggling between a messaging application and one or more client applications associated with the different types of content items shared within respective conversation threads consumes time and computing resources. If the user waits until the conversation thread ends or pauses before selecting a link to a content item to access that content item, the user again consumes time and computing resources looking through the histories of conversation threads to find links to content items.

The subject technology maintains a link index that includes links to content items that were communicated within conversation threads of a messaging application on a computing device. Links to content items may be designated for syndication to other applications on the computing device automatically after being detected in a message of a conversation thread or in response to a user manually selecting the links in the conversation thread. At the request of a client application, links to content items associated with the client application are obtained from the link index and provided to the client application for presentation. In the event that more than one link associated with the requesting client application is obtained from the link index, the links may be ranked based on metadata associated with the links and/or the conversation threads containing the links before providing the links to the requesting client application for presentation. The ranking may be used by the client application to order the links for presentation within the client application either relative to each other or relative to existing links managed by the client application prior to receiving the requested links.

The subject technology summarized above provides for the syndication of content items shared within a first client application, such as a messaging application, to other client applications in a seamless manner. By proactively providing shared links to content items to associated client applications, the subject technology relieves users of a potentially time and resource consuming process of searching through conversation threads to find links to content items of interest after the conversations have ended. Users no longer are required to switch back and forth between client applications looking for shared links to content items and then accessing those links in associated applications as the links are found.

Figure 1:
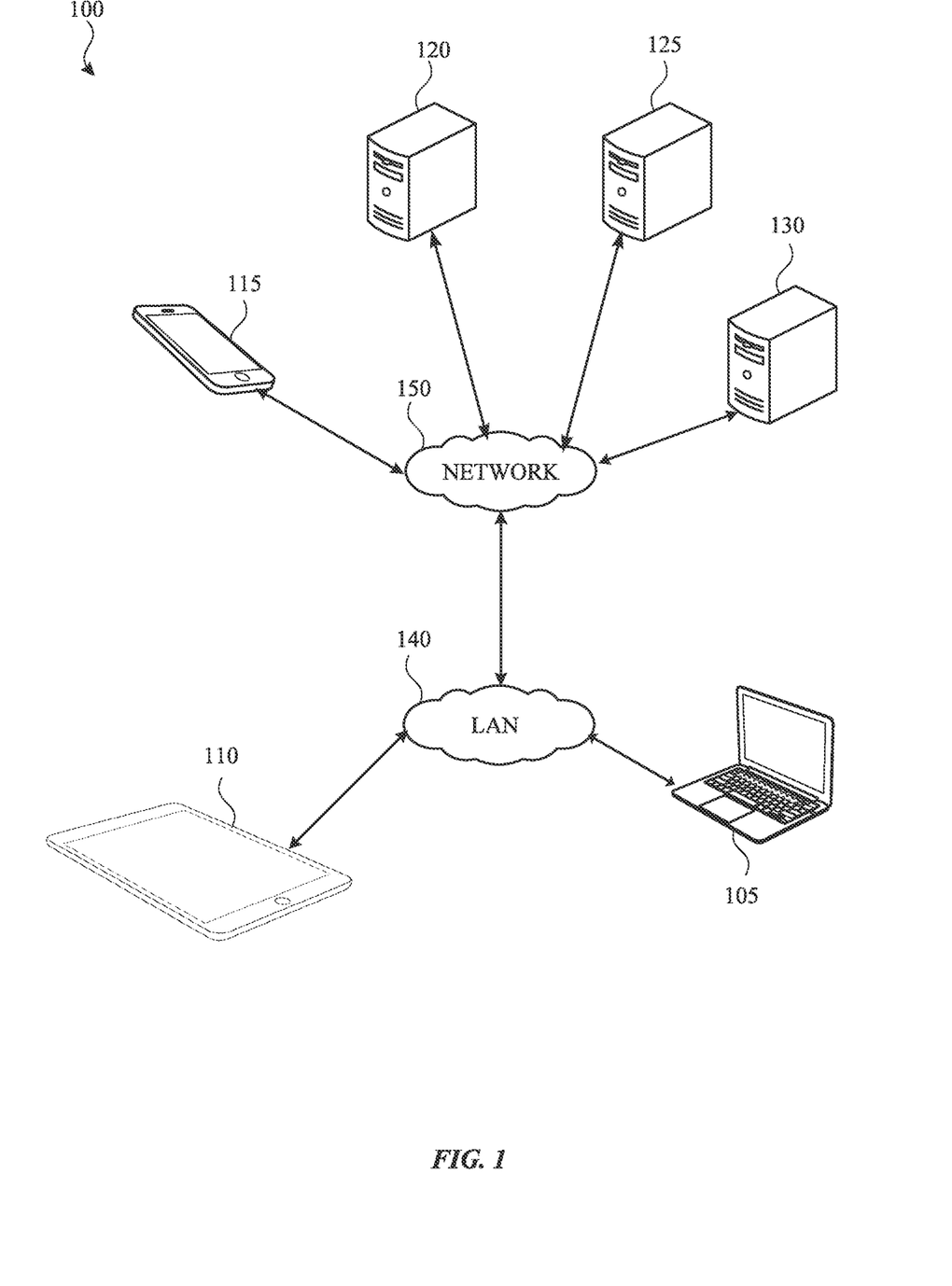
FIG. 1 illustrates an example network environment in which the subject technology may operate in accordance with one or more implementations.

FIG. 1 illustrates an example network environment 100 in which the subject technology may operate in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 1, network environment 100 includes electronic devices 105, 110, and 115 (hereinafter "electronic devices 105-115"), servers 120, 125, and 130 (hereinafter "servers 120-130), local area network (LAN) 140, and network 150. In one or more implementations, LAN 140 may communicatively (directly or indirectly) couple electronic devices 105 and 110 in a local network environment. Additionally, LAN 140 may communicatively couple (directly or indirectly) electronic devices 105 and 110 to any of electronic device 115 and servers 120-130 via network 150.

In one or more implementations, LAN 140 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices.

In one or more implementations, network 150 may be an interconnected network of devices that may include, and/or may be communicatively coupled to, the Internet. For explanatory purposes, network environment 100 is illustrated in FIG. 1 as including electronic devices 105-115, and servers 120-130; however, network environment 100 may include any number of electronic devices and any number of servers.

FIG. 1 illustrates electronic device 105 as a laptop computer, electronic device 110 and a tablet device, and electronic device 115 as smartphone. The subject technology is not limited to these types or numbers of electronic devices. For example, any of electronic devices 105-115 may be a portable computing device such as a laptop computer, a smartphone, a set top box including a digital media player, a tablet device, a wearable device such as a smartwatch or a band, or any other appropriate device that is capable of executing client applications, providing access to the client applications via a graphical user interface, and includes and/or is communicatively coupled to, for example, one or more wired or wireless interfaces, such as wireless local area network (WLAN) radios, cellular radios, Bluetooth radios, Zigbee radios, near field communication (NFC) radios, and/or other wireless radios.

Servers 120-130 each represent one or more computing devices that are configured to provide services to users via client applications being executed on electronic devices 105-115. For example, server 120 may provide a messaging service through which users may send communications to one another via messaging applications executing on respective electronic devices. Server 125 may be configured to provide video services by storing and indexing video files that are accessible using links to the video files in a video client application being executed on the electronic devices. Server 130 may be configured to provide news services by storing and indexing items of news reporting that are accessible using links to the news items in a news client application being executed on the electronic devices. The subject technology is not limited to this number of services or these types of services. For example, one or more of servers 120-130 may provide access to other types of content including, but not limited to, audio files, websites, computer games, documents, multi-media files, etc.

Figure 2:
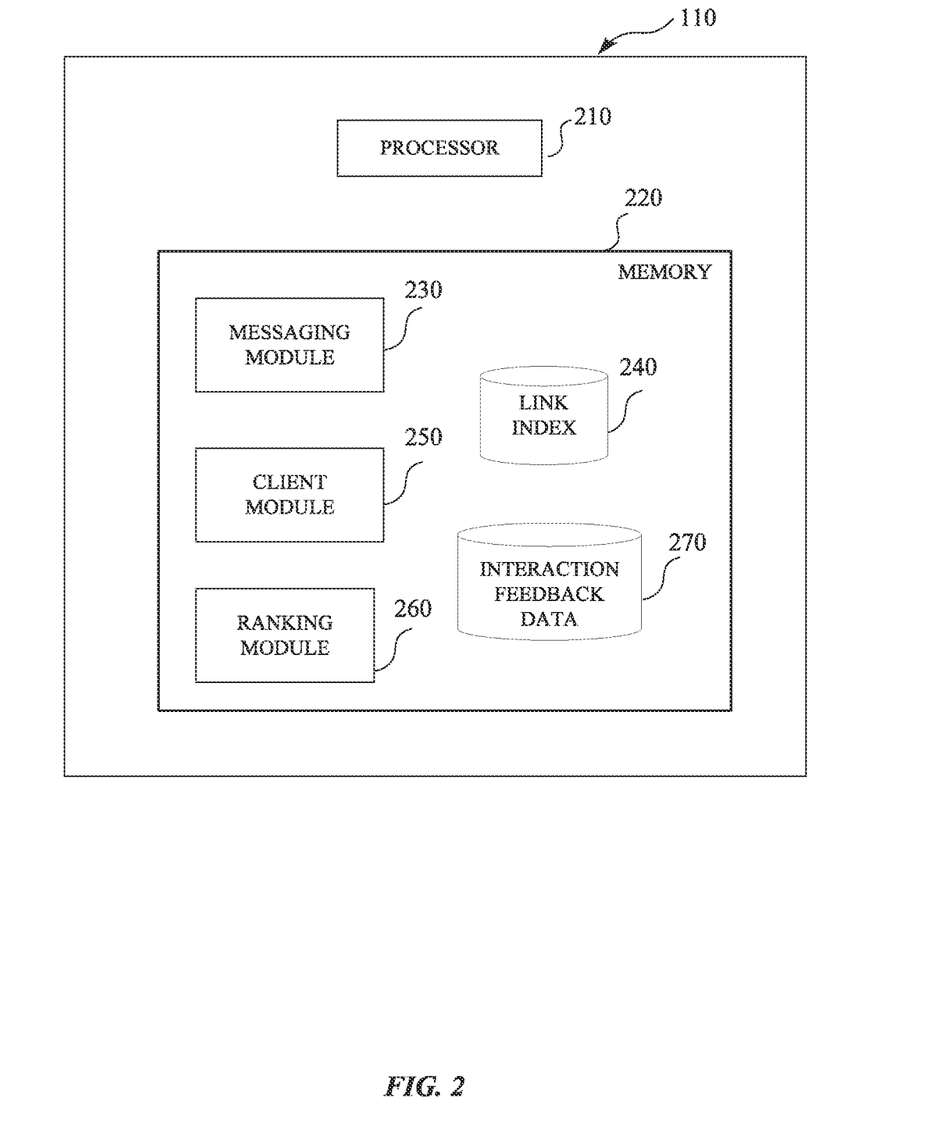
FIG. 2 is a block diagram illustrating components of an electronic device in accordance with one or more implementations of the subject technology.

FIG. 2 is a block diagram illustrating components of an electronic device in accordance with one or more implementations of the subject technology. While FIG. 2 depicts components for electronic device 110, FIG. 2 can correspond to any of electronic devices 105-115 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 2, electronic device 110 includes processor 210 and memory 220. Processor 210 may include suitable logic, circuitry, and/or code that enable processing data and/or controlling operations of electronic device 110. In this regard, processor 210 may be enabled to provide control signals to various other components of electronic device 110. Processor 210 may also control transfers of data between various portions of electronic device 110. Additionally, the processor 210 may enable implementation of an operating system or otherwise execute code to manage operations of electronic device 110.

Processor 210 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Memory 220 may include suitable logic, circuitry, and/or code that enable storage of various types of information such as received data, generated data, code, and/or configuration information. Memory 220 may include, for example, random access memory (RAM), read-only memory (ROM), flash memory, and/or magnetic storage. As depicted in FIG. 2, memory 220 contains messaging module 230, link index 240, client module 250, ranking module 260, and interaction feedback data store 270. The subject technology is not limited to these components both in number and type, and may be implemented using more components or fewer components than are depicted in FIG. 2.

According to aspects of the subject technology, messaging module 230 comprises a computer program having one or more sequences of instructions or code together with associated data and settings. Upon executing the instructions or code, one or more processes are initiated to provide a messaging client on electronic device 110 for communications between a user of electronic device 110 and users of other electronic devices. The messaging client may communicate with a server, such as server 120, to send and receive messages to and from other users. The messaging client manages one or more conversation threads where participants on the conversation threads exchange messages. The messages may include different types of content including text content, image content, animation content, etc. The text content may be conversational in form or may be a link such as a Uniform Resource Locator (URL), and/or other network identifier, to other types of content that are accessible via other types of applications or platforms. The other types of content may include, but are not limited to, audio content, video content, news items, ebooks, social media post, etc.

The messaging client may be configured to detect links in messages of conversation threads and designate those links for syndication to other applications or platforms that may be used to access the content addressed by the links. Detected links may be designated for syndication automatically or manually depending on preconfigured user settings. The user settings may include a global setting allowing a user to enable or disable the designation of links across all conversations and for all client applications and platforms. The user settings may include application specific settings allowing a user to enable or disable the designation of links associated with a particular client application or platform. For example, a user may not be interested in designating links to music content associated with a music application and therefore may disable the designation of any links to music content detected in conversation threads. The user settings also may include conversation thread specific settings allowing a user to enable or disable the designation of links detected within a particular conversation thread.

Regardless of the preconfigured user settings, the messaging client may be configured to allow a user to select a link within a conversation thread and manually designate the link for syndication if the link was not automatically designated. Alternatively, the user may select a link that has been automatically designated for syndication and override the designation to de-designate the link to prevent syndication.

The messaging client may further be configured to donate links designated for syndication for storage in link index 240, along with associated metadata. The associated metadata may include, but is not limited to, an identifier for the conversation thread in which the link was detected, an identifier of the sender of the message containing the link, the time when the link was detected and designated for syndication, whether the link was designated automatically by the messaging client or manually by the user of the messaging client, other participants in the conversation thread, etc.

Before donating a designated link for storage in link index 240, the messaging client may be configured to check a contact state of the sender of the message containing the link. The contact state may indicate whether the sender is found in the recipient's contact database on the electronic device. If the sender is not found in the recipient's contact database, the messaging client may not donate the link for storage in link index 240. Alternatively, the messaging client may check if there are any other recipients of the message from the sender in the conversation thread and determine the contact state of any other recipients. If at least one other recipient is found in the contact database, the messaging client may be configured to donate the designated link for storage in link index 240. These configurations may prevent unwanted content from being syndicated and passed along to other applications executing on the electronic device.

Links being stored in link index 240 may be evaluated for the possibility of being resolved for multiple different client applications. For example, a link to a content item associated with a news application may link to a news item for presentation in the news application. The news item may be referencing an article on the website of a news publisher. In this situation, the link also may be resolved to a URL for the website of the news publisher containing the news article. Both links, the one link resolved to the address of the news item in a news application and the second link resolved to the URL of a website for a web browser to open and present, may be stored in link index 240, along with associated metadata.

According to aspects of the subject technology, client module 250 comprises a computer program having one or more sequences of instructions or code together with associated data and settings. Upon executing the instructions or code, one or more processes are initiated to provide a client application on electronic device 110 for accessing and consuming particular types or formats of content. Examples include, but are not limited to, music client applications, video client applications, news client applications, social media client applications, etc. Access to the content may be controlled by a server, such as server 125 or server 130, with the client application communicating with the server to identify available content and access content selected by a user, for example.

The client application may maintain a list or stream of links to content items associated with the client application. A content item may be considered to be associated with the client application if the client application provides a platform for a user to access and consume the content item. The list or stream may be formed based on user activity such as searching, suggestions or feeds from a service provided by server 125 or 130, for example, and/or from links designated for syndication. The client application may refresh the list or stream of links at startup and may refresh the list or stream periodically and/or in response to a user request. As part of a refresh process, the client application may request ranking module 260 to provide links to content items in link index 240 that are associated with the client application.

According to aspects of the subject technology, ranking module 260 comprises one or more sequences of instructions or code together with associated data and settings. Upon executing the instructions or code, one or more processes are initiated that are configured to obtain one or more links to content items from link index 240 in response to receiving a request for links from client module 250. Ranking module 260 also may obtain metadata associated with the links to content items stored in link index 240. In addition, ranking module 260 may obtain information from interaction feedback data store 270 on interactions the user has had with different content items, conversation threads, and/or respective participants in the conversation threads, as well as the timing and extent of the interactions. The associated metadata and interaction information may be used by ranking module 260 to rank and sort links obtained from link index 240.

Figure 3:
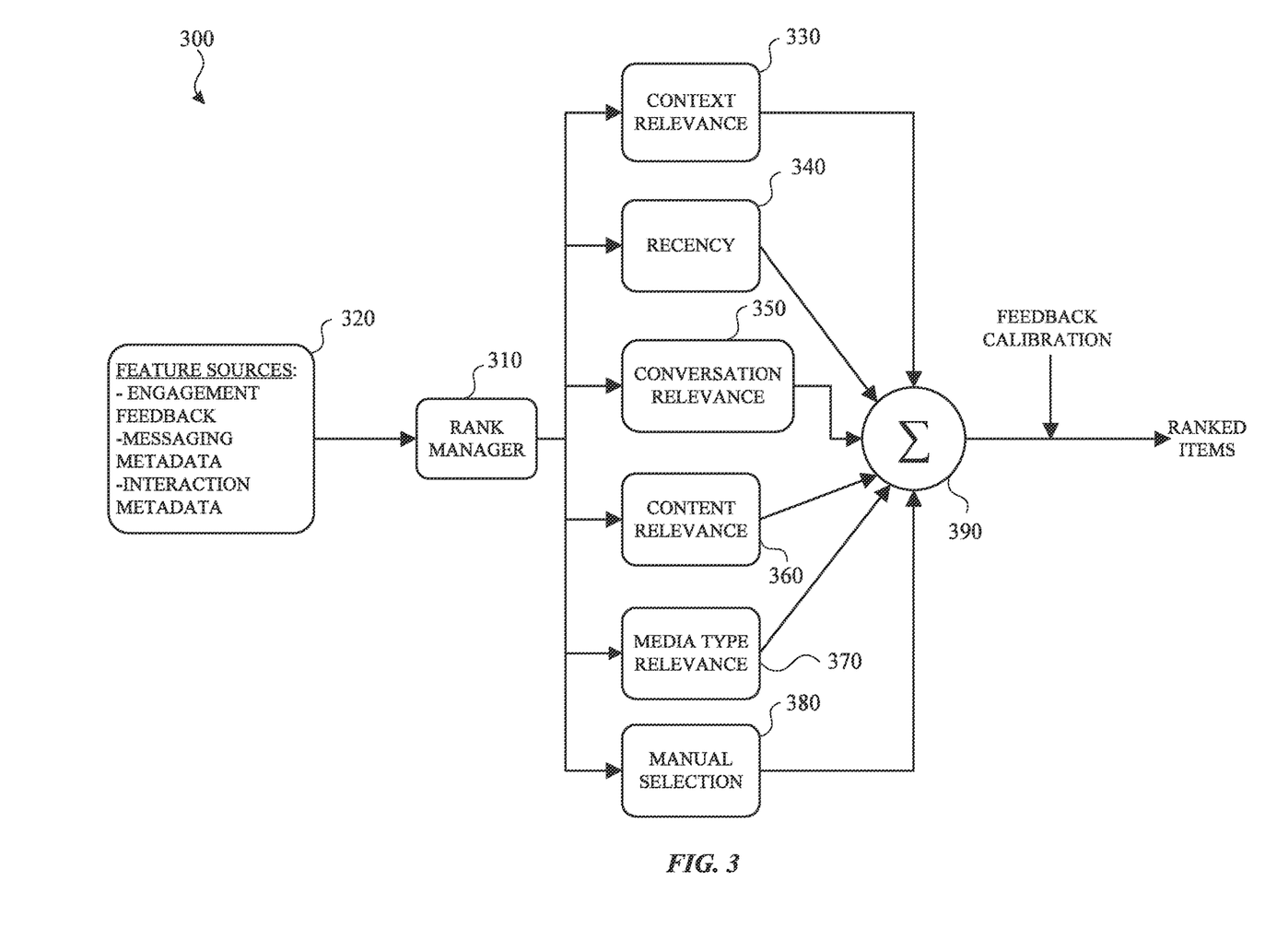
FIG. 3 is a diagram illustrating an example ranking architecture in one or more implementations of the subject technology.

FIG. 3 is a diagram illustrating an example ranking architecture that may be part of ranking module 260 in one or more implementations of the subject technology. As depicted in FIG. 3, ranking architecture 300 includes rank manager 310, feature sources 320, heuristic rankers 330, 340, 350, 360, 370, and 380 (hereinafter "heuristic rankers 330-380"), and scorer 390. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

For a given link to a content item, ranking manager 310 obtains metadata and other information regarding the link as well as information relative to the user of the messaging application on which the link was received from another user from feature sources 320. Feature sources 320 represents different data sources from which the metadata and other information can be obtained. These data sources may include link index 240 and interaction feedback data store 270. The subject technology is not limited to these data sources and may obtain data from other sources in different implementations. Rank manager 310 provides the obtained metadata and other information to one or more of heuristic rankers 330-380.

Heuristic ranker 330 processes information and features having context relevance based on a real-world location of the device and/or user activity known locally to the device that may indicate patterns or user preferences for one type of content over another. For example, video items may be ranked less prominently for a user while the user is at work if the user never watches video content when their device is at a work location. In another example, music links may be ranked more prominently when the device is connected to an automobile system and the user frequently listens to music while driving.

Heuristic ranker 340 processes information and features related to the absolute or relative time that a link was shared, received, or engaged with in some manner by the user. In this regard, links may be ranked more prominently if the links were received recently or if the user recently communicated with a sender of the link.

Heuristic ranker 350 processes information and features regarding the user's behavior relative to the contacts with whom they communicate. For example, links may be ranked more prominently if the user regularly communicates with the sender of the link or always responds to that sender. Links also may be ranked more prominently if the user regularly communicates in group conversation where the link was received.

Heuristic ranker 360 processes information and features regarding the user's behavior or preferences based on the actual contents of received links. For example, links to an article about a known hobby or interest may be ranked more prominently. In this example, links to the scores of a favorite sports team or links to a song by a favorite musician may be ranked higher than other links.

Heuristic ranker 370 processes information and features regarding the user's engagement with links of particular types. For example, links to video content may be ranked more prominently for users who consistently engage with video links rather than text or audio links.

Heuristic ranker 380 processes information and features regarding the user manually indicating a preference for a particular link. In this regard, the user may highlight, "favorite," or "star" a link to cause that link to be ranked more prominently.

Each of heuristic rankers 330-380 that received metadata and other information from rank manager 310 is configured to generate a score $h_i(l)$ for the link l. Scorer 390 is configured to combine the scores from the respective heuristic rankers. According to aspects of the subject technology, scorer 390 sums the respective scores with each score weighted by $\alpha_i$, to generate an overall score for the link according to the following:

$$\text{Score} = \sum_{h_i \in H} \alpha_i \, h_i(l)$$

The respective weights may be adjusted based on user settings, a calibration algorithm, or may be adjusted over time using machine learning. H represents the set of heuristic rankers being used for the particular link to content item being scored.

Feedback calibration may be applied to the overall score generated by scorer 390. According to aspects of the subject technology, the feedback calibration represents interactions by the user with the linked content item and/or the conversation thread participant that shared the link. For example, the feedback calibration may indicate whether the user consumed the linked content item, if the user partially consumed the linked content item, if the user deleted the linked content item from presentation by a client application or in the conversation thread, number of times the link to the content item has been shared with the user without the user taking action with respect to the linked content item, etc. The feedback calibration is configured to use this information to enhance the overall score, lower the overall score, or remove the link from further consideration. In one or more implementations, links may be removed from link index 240 after the linked content item has been completely consumed by the user, or if the link has remained in the link index 240 for a predetermined period of time without being interacted with by the user. The calibrated score is associated with the link to the content item and used by either ranking module 260 or client module 250 to order the link relative to other links either returned by ranking module 260 in response to a request from client module 250, or relative to other links being managed and presented by client module 250.

User interactions with links to content items either through messaging module 230 or client module 250 are recorded on the electronic device executing the modules. To provide a consistent experience on other electronic devices associated with a particular user, the user interactions may be synced across the group of electronic devices associated with the user. The syncing may be peer-to-peer, such as directly between electronic devices 105 and 110 in FIG. 1. Alternatively, the syncing information may be shared with another electronic device via a server. However, to maintain user privacy the syncing information may be encrypted so that the server only facilitates the messaging between the two electronic devices without knowing the content of the messages.

The subject technology is not limited to the types and/or numbers of heuristic rankers as depicted in FIG. 3. Other implementations may incorporate more or fewer heuristic rankers and/or may utilize different groupings of signals provided to the respective heuristic rankers. In addition, scorer 390 may use a different linear function to rank links or may use nonlinear functions such as neural networks to rank links.

Once ranking module 260 has received and ranked the links associated with the requesting client application, ranking module 260 may be configured to organize the ranked links into a plurality of lists. In one or more implementations, the first list may contain the top ranked link associated with the requesting client application. Alternatively, the first list may contain a group of top ranked links associated with the requesting application. The ranking of links for the requesting client application may be repeated after a period of time and the link or links in the first list may be updated if the rankings change.

In one or more implementations, the second list may contain links associated with the requesting client application that were manually designated for syndication by the user but not included in the first list. The links in the second list may be organized in chronological order based on a timestamp of when the user manually designated the link for syndication. These links may remain in the second list for a predetermined period of time (e.g., ten days) or until the linked content has been consumed by the user.

In one or more implementations, the third list may contain the remaining links associated with the requesting client application that were returned from querying link index 240 that are not included in the first list or the second list. The links in the third list may be organized in chronological order based on the time the linked content was consumed, the time when the linked content was designated for syndication by the user, or the time when the link was received in the messaging application.

Ranking module 260 may be configured to provide a predetermined number of links to a requesting client application. Ranking module 260 may provide links first from the first list, second from the second list, and third from the third list as needed until the predetermined number of links have been provided. The predetermined number may vary depending on the client application requesting links with some client applications requesting more links in each request than other client applications. Ranking module 260 may be configured to update the organization of links across the three lists when a requesting client application sends a request for more links to be displayed or after a period of time has elapsed. Links may remain in link index 240 for a predetermined period of time (e.g., one year) before being dropped from link index 240 and therefore no longer are available to be provided to a requesting application.

Figure 4:
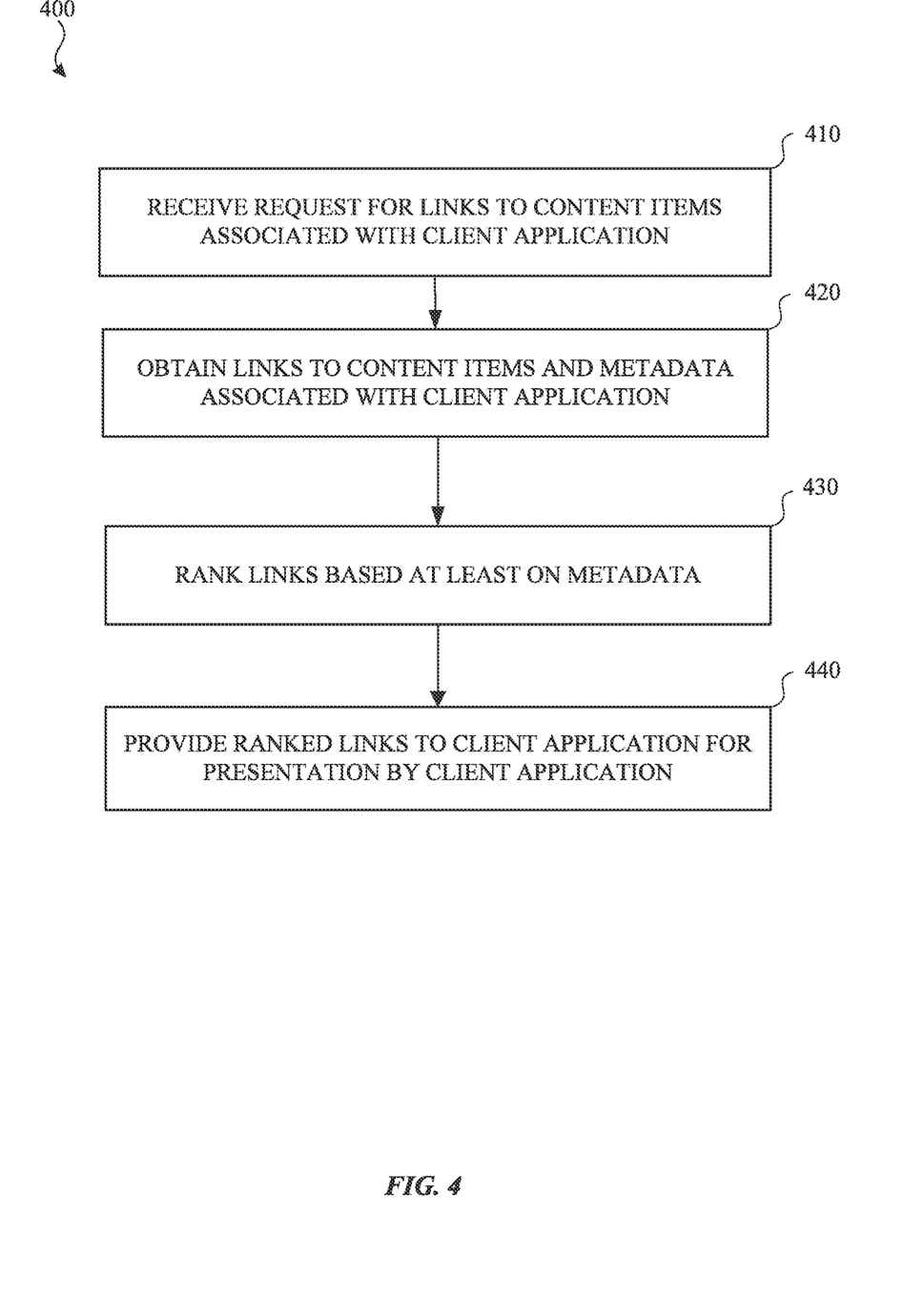
FIG. 4 illustrates an example process for syndicating content according to aspects of the subject technology.

FIG. 4 illustrates an example process for syndicating content according to aspects of the subject technology. For explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

Example process 400 may be initiated upon a process (e.g., first process) in ranking module 260 being executed on an electronic device receiving a request for links to content items associated with a client application from a process (e.g., second process) in client module 250 also being executed on the electronic device (block 410). The process in ranking module 260 may execute as a background process or daemon that listens for requests from client module 250, as well as any other client applications that are being executed on the electronic device.

In response to the request for links to content items, the process in ranking module 260 may query link index 240 for any links to content items associated with the requesting client module 250 to obtain the links (block 420). Link index 240 may contain links to content items that were communicated via a process (e.g., third process) in messaging module 230. The metadata stored with the links in link index 240 may include a field identifying client applications or platforms that are associated with the type of content of the linked content item. Accordingly, ranking module 260 may query link index 240 for any links having metadata associating the linked content with client module 250.

The links to content items obtained from link index 240 may be ranked using the ranking architecture and organized into lists as described above (block 430). The ranked links to content items associated with client module 250 may be provided to client module 250 for presentation to the user (block 440).

Client module 250 may be configured to present the links to content items in a number of different manners. For example, the links received from ranking module 260 may be kept separate from links already being managed internally by client module 250, or the received links may be intermingled with the existing links in client module 250. The ranking scores may provide indicators for how to rank or place the received links relative to the existing links.

The links received from ranking module 260 also may be annotated to provide an indication to the user on the source of the links now being presented by client module 250. The annotation may identify the sender of the message that sent the link, the timing of the message that included the link, all or a portion of the accompanying message that came with the link, etc. In addition, client module 250 may present the received links to the user with graphical interface elements associated with the link. Upon selecting one of these interface elements, a frame may be launched for a process executing from messaging module. The frame may contain the conversation thread in which the link was initially shared and may allow the user to continue the conversation with the participant(s) of the conversation thread without leaving the user interface generated by client module 250.

Figure 5:
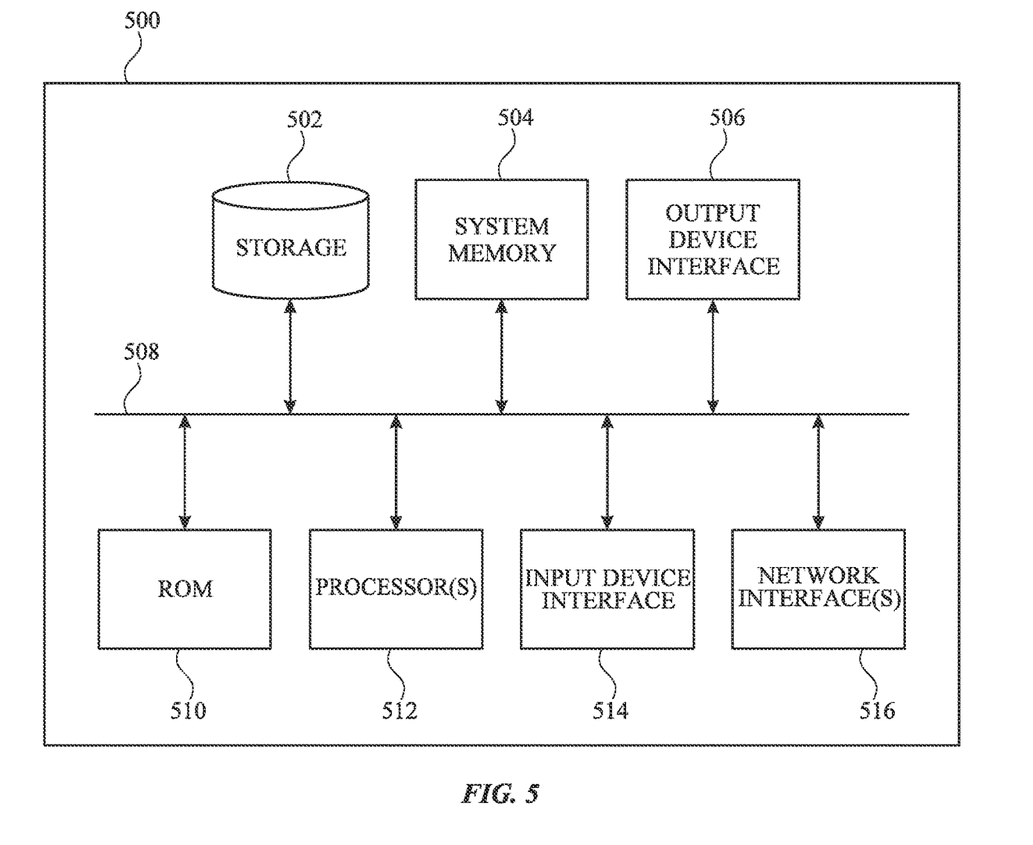
FIG. 5 illustrates an example electronic system with which aspects of the subject technology may be implemented in accordance with one or more implementations.

FIG. 5 illustrates an electronic system 500 with which one or more implementations of the subject technology may be implemented. Electronic system 500 can be, and/or can be a part of, one or more of electronic devices 105-115, or servers 120-130 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the content provider 112 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as random access memory (RAM), dynamic RAM (DRAM), static RAM (SRAM), thyristor RAM (T-RAM), Z-RAM, and twin-transistor RAM (TTRAM). The computer-readable medium also can include any non-volatile semiconductor memory, such as read-only memory (ROM), programmable ROM (PROM), erasable programmable ROM (EPROM), electrically erasable programmable ROM (EEPROM), non-volatile RAM (NVRAM), flash, non-volatile SRAM (nvSRAM), ferroelectric RAM (FeRAM), ferroelectric T-RAM (FeT-RAM), magnetoresistive RAM (MRAM), phase-change RAM (PRAM, conductive bridging RAM (CBRAM), silicon-oxide-nitride-oxide-silicon (SONOS) memory, resistive RAM (RRAM, nano-RAM (NRAM), racetrack memory, floating junction gate (FJG) RAM, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

In accordance with the subject disclosure, a method is provided that includes receiving, by a first process executing on an electronic device and from a second process executing on the electronic device, a request for links to content items that are associated with the second process. The method further includes obtaining, by the first process and from a link index, a link to a content item associated with the second process, wherein the link index is locally stored on the electronic device and the link index comprises links to content items communicated via a third process executing on the electronic device. The link to the content item obtained from the link index is provided by the first process for presentation by the second process, wherein selection of the link causes the second process to present the content item.

The first process may obtain from the link index a plurality of links to content items associated with the second process and associated metadata. The plurality of links may be ranked by the first process based at least in part on the associated metadata. The ranked plurality of links may be provided for presentation by the second process.

A message may be received from a participant in a first conversation thread of the third process and a first content link detected in the message. The detected first content link may be designated for syndication and stored in the local link index. The first content link may be automatically designated in the local messaging application upon detecting the first content link in the first conversation thread. The first content link may be automatically designated based on a preconfigured user setting set to designate all content links received in conversation threads of the third process. The first content link may be automatically designated based on a preconfigured user setting set to designate all content links received in a designated conversation thread of the third process, wherein the first conversation thread is the designated conversation thread. The first content link may be designated in the third process in response to a user selection of the first content link. The first content link designated in response to the user selection is sorted higher than another content link automatically designated in the third process.

Storing the first content link in the local link index may include resolving the first content link into a first resolved link, wherein the first resolved link is recognizable and accessible to the second process, resolving the first content link into a second resolved link, wherein the second resolved link is recognizable and accessible to a fourth process different from the second process executing on the computing device, and storing the first resolved link and the second resolved link in the local link index.

The sorted content links may be detected in an active conversation thread of the third process. The method may further include receiving indication of a user selection of an interface element presented in association with the sorted content links by the second process, and presenting the active conversation thread in a user interface of the second process in response to the indicated user selection.

An indication of user interaction with one of the sorted content links presented by the second process may be received and a record of the user interaction stored in a local interaction data store. Contents of the local interaction data store may be synced with a remote interaction data store, wherein the local interaction data store is located on the electronic device and the remote interaction data store is located on another electronic device. The ranked plurality of links may be sorted into a first set based on the ranking, a second set of links manually designated for syndication, and a third set of links automatically designated for syndication.

A non-transitory computer-readable medium may be provided storing instructions which, when executed by one or more processors, cause the one or more processors to perform operations. The operations may include receiving, by a first process executing on an electronic device and from a second process executing on the electronic device, a request for links to content items that are associated with the second process, and obtaining, by the first process and from a link index, a plurality of links to content items associated with the second process and associated metadata, wherein the link index is locally stored on the electronic device and the link index comprises links to content items communicated via a third process executing on the electronic device. The operations may further include ranking, by the first process, the plurality of links based at least in part on the associated metadata, and providing, by the first process, the ranked plurality of links to the content item obtained from the link index for presentation by the second process, wherein selection of one of the plurality of links causes the second process to present the content item associated with the selected link.

The operations may further include receiving a message from a participant in a first conversation thread of the third process, detecting a first content link in the message, designating the first content link for syndication, and storing the first content link in the local link index.

Storing the first content link in the local link index may include resolving the first content link into a first resolved link, wherein the first resolved link is recognizable and accessible to the second process, resolving the first content link into a second resolved link, wherein the second resolved link is recognizable and accessible to a fourth process different from the second process executing on the computing device, and storing the first resolved link and the second resolved link in the local link index.

The operations may further include receiving an indication of user interaction with one of the sorted content links presented by the second process, storing a record of the user interaction in a local interaction data store, and syncing contents of the local interaction data store with a remote interaction data store. The local interaction data store may be located on the electronic device and the remote interaction data store is located on another electronic device.

A device is provided that includes a memory storing a plurality of computer programs and a link index comprising links to content items communicated via a messaging application of the plurality of computer programs, and one or more processors configured to execute instructions of the plurality of computer programs. A request for links to content items that are associated with the client application may be received by a ranking application of the plurality of computer programs executing on the device and from a client application of the plurality of computer programs executing on the device, a request for links to content items that are associated with the client application. A plurality of links to content items associated with the client process and associated metadata may be obtained by the ranking application and from the link index, and the plurality of links may be ranked based at least in part on the associated metadata. The ranked plurality of links to the content item obtained from the link index may be provided for presentation by the client process, wherein selection of one of the plurality of links causes the client process to present the content item associated with the selected link.

The one or more processors may be further configured to receive a message from a participant in a first conversation thread of the messaging application, detect a first content link in the message, designate the first content link for syndication, and store the first content link in the local link index. The first content link may be automatically designated in the local messaging application upon detecting the first content link in the first conversation thread based on a preconfigured user setting. The first content link may be designated in the messaging application in response to a user selection of the first content link.

As described herein, aspects of the subject technology may include the collection and transfer of data from an application to other computing devices. The present disclosure contemplates that in some instances, this collected data may include personal information data that uniquely identifies or can be used to identify a specific person. Such personal information data can include demographic data, location-based data, online identifiers, telephone numbers, email addresses, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in syndicating content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of video conferencing, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving a message from a participant in a first conversation thread of a third process;
   detecting a first content link in the message, and automatically designating the detected first content link for syndication;
   storing the first content link in a local link index;
   receiving, by a first process executing on an electronic device and from a second process executing on the electronic device, a request for links to content items that resolve to the content items in the second process;
   obtaining, based on the request, by the first process and from the local link index, a link to a content item that resolves to the content item in the second process, wherein the local link index is locally stored on the electronic device and the local link index comprises links to content items communicated via the third process executing on the electronic device; and
   providing, by the first process, the link to the content item obtained from the local link index for presentation by the second process, wherein selection of the link causes the second process to present the content item.

2. The method of claim 1, further comprising:
   obtaining, by the first process and from the local link index, a plurality of links to the content items associated with the second process and associated metadata;
   ranking, by the first process, the plurality of links based at least in part on the associated metadata; and
   providing, by the first process, the ranked plurality of links for presentation by the second process.

3. The method of claim 2, wherein the ranked plurality of links were detected in an active conversation thread of the third process, and wherein the method further comprises:
   receiving indication of a user selection of an interface element presented in association with the ranked plurality of links by the second process; and
   presenting the active conversation thread in a user interface of the second process in response to the indicated user selection.

4. The method of claim 2, further comprising:
   receiving an indication of user interaction with one of the ranked plurality of links presented by the second process;
   storing a record of the user interaction in a local interaction data store; and syncing contents of the local interaction data store with a remote interaction data store,
   wherein the local interaction data store is located on the electronic device and the remote interaction data store is located on another electronic device.

5. The method of claim 2, wherein the ranked plurality of links are sorted into a first set based on the ranking, a second set of links manually designated for syndication, and a third set of links automatically designated for syndication.

6. The method of claim 1, wherein the first content link is automatically designated based on a preconfigured user setting set to designate all content links received in conversation threads of the third process.

7. The method of claim 1, wherein the first content link is automatically designated based on a preconfigured user setting set to designate all content links received in a designated conversation thread of the third process,
   wherein the first conversation thread is the designated conversation thread.

8. The method of claim 1, wherein a second content link is designated in the third process in response to a user selection of the second content link.

9. The method of claim 8, wherein the second content link designated in response to the user selection is sorted higher than the first content link automatically designated in the third process.

10. The method of claim 1, wherein storing the first content link in the local link index comprises:
resolving the first content link into a first resolved link, wherein the first resolved link is recognizable and accessible to the second process;
resolving the first content link into a second resolved link, wherein the second resolved link is recognizable and accessible to a fourth process different from the second process executing on the electronic device; and
storing the first resolved link and the second resolved link in the local link index.

11. A non-transitory computer-readable medium storing instructions which, when executed by one or more processors, cause the one or more processors to perform operations comprising:
receiving a message from a participant in a first conversation thread of a third process;
detecting a first content link in the message, and automatically designating the detected first content link for syndication;
storing the first content link in a local link index;
receiving, by a first process executing on an electronic device and from a second process executing on the electronic device, a request for links to content items that resolve to the content items in the second process;
obtaining, based on the request, by the first process and from the local link index comprising links to different content items associated with different processes, a plurality of links to content items that resolve to the content items in the second process and associated metadata, wherein the local link index is locally stored on the electronic device; and
providing, by the first process, the plurality of links to the content items obtained from the local link index for presentation by the second process, wherein selection of one of the plurality of links causes the second process to present a content item associated with the selected link.

12. The non-transitory computer-readable medium of claim 11, wherein storing the first content link in the local link index comprises:
resolving the first content link into a first resolved link, wherein the first resolved link is recognizable and accessible to the second process;
resolving the first content link into a second resolved link, wherein the second resolved link is recognizable and accessible to a fourth process different from the second process executing on the electronic device; and
storing the first resolved link and the second resolved link in the local link index.

13. The non-transitory computer-readable medium of claim 11, the operations further comprising:
receiving an indication of user interaction with one of the plurality of links presented by the second process;
storing a record of the user interaction in a local interaction data store; and
syncing contents of the local interaction data store with a remote interaction data store,
wherein the local interaction data store is located on the electronic device and the remote interaction data store is located on another electronic device.

14. The non-transitory computer-readable medium of claim 11, wherein the operations further comprise:
ranking, by the first process, the plurality of links based at least in part on the associated metadata.

15. The non-transitory computer-readable medium of claim 11, wherein the first content link is automatically designated in the third process upon detecting the first content link in the first conversation thread based on a preconfigured user setting.

16. A device, comprising:
a plurality of computer programs; and
a link index comprising links to content items communicated via a messaging application of the plurality of computer programs, each respective link being stored with respective associated metadata that indicates a respective one of the plurality of computer programs associated with the respective link; and
one or more processors configured to execute instructions of the plurality of computer programs to:
receive a message from a participant in a first conversation thread of the messaging application;
detecting a first content link in the message, and automatically designating the detected first content link for syndication;
storing the first content link in the link index;
receive, by an application of the plurality of computer programs executing on the device and from a client application of the plurality of computer programs executing on the device, a request for links to content items that resolve to the content items in the client application;
obtain, based on the request, by the application and from the link index, a plurality of links to the content items that resolve to the content items in the client application and associated metadata; and
provide, by the application, the plurality of links to the content items obtained from the link index for presentation by the client application, wherein selection of one of the plurality of links causes the client application to present a content item associated with the selected link.

17. The device of claim 16, wherein the first content link is automatically designated in the messaging application upon detecting the first content link in the first conversation thread based on a preconfigured user setting.

18. The device of claim 16, wherein a second content link is designated in the messaging application in response to a user selection of the second content link.

19. The device of claim 16, wherein the one or more processors are further configured to execute instructions of the plurality of computer programs to:
rank, by the application, the plurality of links based at least in part on the associated metadata.

20. The device of claim 16, wherein the one or more processors are further configured to execute instructions of the plurality of computer programs to:
resolve the first content link into a first resolved link, wherein the first resolved link is recognizable and accessible to the client application;
resolve the first content link into a second resolved link, wherein the second resolved link is recognizable and accessible to another client application different from the client application; and
store the first resolved link and the second resolved link in the link index.

* * * * *